United States Patent [19]
Aramaki

[11] Patent Number: 5,453,966
[45] Date of Patent: Sep. 26, 1995

[54] DISK PLAYER MAT COMPUTES AND INDICATES A COMPUTABLE TIME OF A DISK ACCORDING TO SUBCODE INFORMATION RECORDED ON THE DISK

[75] Inventor: Junichi Aramaki, Chiba, Japan

[73] Assignee: Sony Corporation, Japan

[21] Appl. No.: 245,222

[22] Filed: May 17, 1994

Related U.S. Application Data

[62] Division of Ser. No. 18,692, Feb. 17, 1993, abandoned.

[30] Foreign Application Priority Data

Feb. 18, 1992 [JP] Japan ................................. 4-069195

[51] Int. Cl.⁶ .................................................. G11B 7/00
[52] U.S. Cl. .............................. 369/58; 369/30; 369/32
[58] Field of Search ............................... 369/13, 53, 54, 369/58, 30, 32; 360/31, 137

[56] References Cited

U.S. PATENT DOCUMENTS

| | | | |
|---|---|---|---|
| 4,280,159 | 7/1981 | Nakayama | 360/137 |
| 4,746,013 | 5/1988 | Suzuki et al. | 206/309 |
| 4,862,439 | 8/1989 | Ando et al. | 369/30 |
| 4,977,553 | 12/1990 | Yokogawa | 369/44.26 |
| 5,060,218 | 10/1991 | Chiyomatsu | 369/47 |
| 5,136,569 | 8/1992 | Fennema et al. | 369/58 |
| 5,175,719 | 12/1992 | Iimura | 369/58 |
| 5,177,728 | 1/1993 | Otsubo et al. | 369/48 |
| 5,200,943 | 4/1993 | Sano et al. | 369/48 |
| 5,202,874 | 4/1993 | Zucker et al. | 369/54 |
| 5,202,877 | 4/1993 | Yanagida | 369/58 |
| 5,229,985 | 7/1993 | Oshiba | 369/54 |
| 5,237,560 | 8/1993 | Tani et al. | 369/291 |

FOREIGN PATENT DOCUMENTS

| | | | |
|---|---|---|---|
| 61-000695 | 1/1986 | Japan . | |
| 61-258367 | 11/1986 | Japan | 369/58 |
| 62-214552 | 9/1987 | Japan | 369/58 |

*Primary Examiner*—Robert S. Tupper
*Assistant Examiner*—Paul J. Ditmyer
*Attorney, Agent, or Firm*—Limbach & Limbach; Alan S. Hodes

[57] ABSTRACT

A disk player including a driving device for driving a disk loaded in a drive mechanism; a reading device for reading recorded data from the disk driven by the driving device; a reproduced signal decoding device for decoding an audio signal of the recorded data read by the reading device; a subcode information decoding device for decoding the subcode of the recorded data; a recordable time detecting device for computing the recordable time of the disk according to the subcode information decoded by the subcode information decoding device; and an indicating device for indicating the computed recordable time. Accordingly, the user can immediately recognize the recordable time of the disk loaded into the disk player or kept in the loaded condition.

2 Claims, 2 Drawing Sheets

DISK PLAYER MAT COMPUTES AND INDICATES A COMPUTABLE TIME OF A DISK ACCORDING TO SUBCODE INFORMATION RECORDED ON THE DISK

This is a divisional of application Ser. No. 08/018,692, filed Feb. 17, 1993 now abandoned.

BACKGROUND OF THE INVENTION

The present invention relates to a disk player capable or indicating a kind of a disk loaded in disk player or a signal recorded condition of the disk.

There has been proposed a new type of magneto-optical disk for recording and/or reproducing an audio signal or the like. Such a magneto-optical disk is generally classified into a recorded disk (unrecordable disk) on which a music source or the like is previously recorded, a recorded disk on which a user can record a desired source, and a partially recorded disk (partially recordable disk) having an unrecordable area and a recordable area.

These different kinds of disks are accommodated in respective cartridges having substantially the same external size, and data can be recorded to and/or reproduced from the disks by a common disk player.

Accordingly, before operating a playback button or a record button provided on the disk player, the user must recognize the kind of the disk to be loaded into the disk player.

However, since the three kinds of disks are accommodated in the respective cartridges having substantially the same external size as mentioned above, there is a possibility that the user will erroneously recognize the kind of the disk to be loaded into the disk player. For instance, if the user intends to record a music or the like into the disk player, he may notice the erroneous selection of the disk kind until the recording operation is not accepted by the disk player. In another case, if the user intends to reproduce a music or the like but erroneously loads the recordable disk having no record rather than the recorded disk or the partially recorded disk, he may not notice the erroneous selection of the disk until the reproducing operation of the disk player is started. Further, in the case where the disk is kept in a loaded condition in the disk player, the user cannot recognize the kind of the disk in the loaded condition until unloading the disk from the disk player.

Further, in the case of recording additional data to the recordable disk or the partially recorded disk, the user cannot recognize a recordable time remaining in the disk until once performing the reproducing operation and operating to indicate the remaining recordable time. Further, in the case of loading recordable disk having no previously recorded data into the disk player, the user cannot recognize whether or not the disk has any data recorded on it until once performing the reproducing operation.

SUMMARY OF THE INVENTION

It is accordingly a first object of the present invention to provide a disk player which enables the user to immediately recognize the kind of the disk loaded into the disk player or kept in the loaded condition.

Is a second object of the present invention to provide a disk player which enables the user to immediately recognize a recordable time on the disk loaded into the disk player or kept in the loaded condition.

It is a third object of the present invention to provide a disk player which enables the user to immediately recognize an unrecorded condition of the disk loaded into the disk player or kept in the loaded condition when no data is recorded on the disk.

According to a first aspect of the present invention, there is provided a disk player comprising driving means for driving a disk loaded in a drive mechanism; reading means for reading recorded data from said disk driven by said driving means; reproduced signal decoding means for decoding an audio signal of said recorded data read by said reading means; disk identifying means for identifying a kind of said disk loaded in said drive mechanism; and indicating means for indicating identification of one of at least a recorded disk and a recordable disk according to identification information obtained by said disk identifying means.

With this construction, the kind of the disk loaded in the drive mechanism is identified as one of at least a recorded disk and a recordable disk by the disk identifying means, and the kind of the disk thus identified is indicated by the indicating means according to the identification information obtained by the disk identifying means. The identification by the disk identifying means may be realized by decoding subcode information recorded on the disk and identifying the kind of the disk according to the subcode information decoded, or by detecting whether a shutter is provided on a single side or a double side of a disk cartridge accommodating the disk loaded in the drive mechanism and identifying the kind of the disk according to an output from the detecting means.

According to a second aspect of the present invention, there is provided a disk player comprising driving means for driving a disk loaded in a drive mechanism: reading means for reading recorded data from said disk driven by said driving means; reproduced signal decoding means for decoding an audio signal of said recorded data read by said reading means; subcode information decoding means for decoding subcode information of said recorded data read by said reading means; and indicating means for indicating a recordable time on said disk loaded in said drive mechanism according to said subcode information obtained by said subcode information decoding means.

With this construction, the subcode information of the recorded data read by the reading means decoded by the subcode information decoding means, and the recordable time on the disk loaded in the drive mechanism is indicated by the indicating means according to the subcode information decoded.

According to a third aspect of the present invention, there is provided a disk player comprising driving means for driving a disk loaded in a drive mechanism; reading means for reading recorded data from said disk driven by said driving means; reproduced signal decoding means for decoding an audio signal of said recorded data read by said reading means; subcode information decoding means for decoding subcode information of said recorded data read by said reading means; and indicating means for indicating an unrecorded condition of said disk loaded in said drive mechanism according to said subcode information obtained by said subcode information decoding means.

With this construction, the subcode information of the recorded data read by the reading means is decoded by the subcode information decoding means, and an unrecorded condition of the disk loaded in the drive mechanism where no data is recorded on the disk is indicated by the indicating means according to the subcode information decoded.

3

Other objects and features of the invention will be more fully understood front the following detailed description and appended claims when taken with the accompanying drawings.

DETAILED DESCRIPTION OF THE PREFERRED EMBODIMENTS

Figure 1:
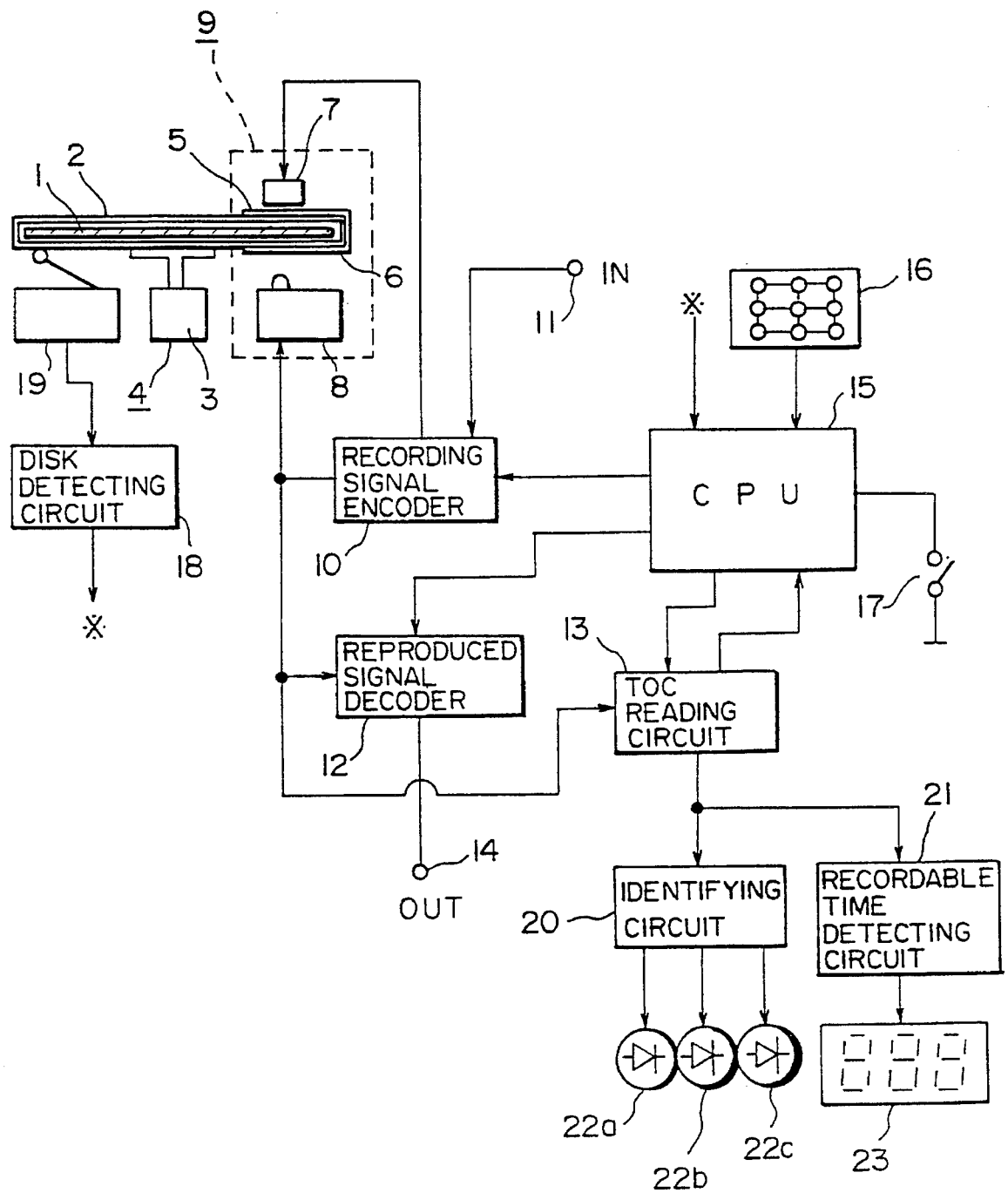
FIG. 1 is a block diagram of a disk player according to a preferred embodiment of the present invention.

Referring now to FIG. 1, there is shown a disk player for a magneto-optical disk according to a preferred embodiment of the present invention. A magneto-optical disk 1 is accommodated in a disk cartridge 2. The disk cartridge 2 may be loaded into a drive mechanism 4 including a spindle motor 3. The magneto-optical disk 1 in the disk cartridge 2 loaded into the drive mechanism 4 is rotationally driven by the spindle motor 3. Two shutter 5 and 6 are provided on both surfaces of the disk cartridge 2. When the disk cartridge 2 is loaded into the drive mechanism 4, both the shutters 5 and 6 are opened to partially expose both surfaces of the magneto-optical disk 1.

A magnetic head 7 is located so as to face the exposed upper surface of the disk 1, and an optical head 8 for writing and reading is located so as to face the exposed lower surface of the disk 1. The magnetic head 7 and the optical head 8 constitute a magneto-optical head unit 9. A recording signal encoder 10 is connected to both the magnetic head 7 and the optical head 8. The recording signal encoder 10 encodes an audio signal supplied to an audio input terminal 11 in recording a music source or the like and supplies the encoded audio signal to the magnetic head 7, while supplying a bias signal to the optical head 8, thus effecting magneto-optical recording to the disk 1.

A reproduced signal decoder 12 and a TOC reading circuit 13, for decoding subcode information, are connected to the optical head 8. The reproduced signal decoder 12 decodes an audio signal of recorded data read by the optical head 8 and outputs the decoded audio signal to an output terminal 14. The TOC reading circuit 13 decodes TOC information as subcode information of the recorded data read by the optical head 8.

A central processing unit (CPU) 15 is connected to the recording signal encoder 10, the reproduced signal decoder 12 and the TOC reading circuit 13 to supply control signals to these elements 10, 12 and 13. An operation board 16 and a power switch 17 are connected to the CPU 15. A disk detecting circuit 18 is also connected to the CPU 15.

The disk detecting circuit 18 generates a control signal when it receives an output from a disk detecting switch 19 and supplies a disk detecting signal based on the control signal to the CPU 15. The disk detecting switch 19 is turned on when the disk cartridge 2 is loaded into the drive mechanism 4.

An identifying circuit 20 and a recordable time detecting circuit 21 are connected to the TOC reading circuit 13, so that the TOC information decoded by the TOC reading circuit 13 is supplied to the identifying circuit 20 and the recordable time detecting circuit 21.

The identifying circuit 20 identifies the kind of the disk 1 loaded in the drive mechanism 4 as one of three kinds of disks according to the TOC information supplied from the TOC reading circuit 13. The first kind of disk is a recorded disk (i.e., unrecordable disk) on which a music source or the like is previously recorded; the second kind of disk is a recordable disk on which a user can record a desired source; and the third kind of disk is a partially recorded disk (i.e., partially recordable disk) having a recordable area and an unrecordable area. The identifying circuit 20 generates an identifying signal to actuate one of three LEDs 22a, 22b and 22c.

In the case where the kind of the disk 1 loaded in the drive mechanism 4 is identified as either the second kind of disk or the third kind of disk by the identifying circuit 20, the recordable time detecting circuit 21 computes a recordable time on the disk 1 according to the TOC information supplied from the TOC reading circuit 13 and drives a numerical indicating element 23 according to the result of the computation. The numerical indicating element 23 is constructed of 7-segment LEDs, for example.

In operation, when the disk cartridge 2 is first loaded into the drive mechanism 4 of the disk player, the disk player, the disk detecting switch 19 is turned on to generate a detection signal. In response to the detection signal, the disk detecting circuit 18 supplies a control signal to the CPU 15. Then, the CPU 15 starts to operate the drive mechanism 4 and the TOC reading circuit 13. Accordingly, the disk 1 is driven by the drive mechanism 4, and the optical head 8 reads the recorded data on the disk 1. The TOC information of the recorded data is decoded by file TOC reading circuit 13, and is then supplied to the identifying circuit 20. The identifying circuit 20 identifies the kind of the disk 1 as one of the first to third kinds of disks according to the TOC information supplied from the TOC reading circuit 13 and drives one of the LEDs 22a to 22c according to the result of identification. Thus, the user can immediately recognize the kind of the disk 1 loaded in the drive mechanism 4.

Furthermore, when the kind of the disk 1 loaded in the drive mechanism 4 is identified as either the second kind of disk or the third kind of disk, the recordable time detecting circuit 21 computes a recordable time on the disk 1 according to file TOC information supplied from the TOC reading circuit 13 and drives the numerical indicating element 23 according to the result of computation to numerically indicate the recordable time on the disk 1. Thus, the user can immediately recognize the recordable time on the disk 1 loaded in the drive mechanism 4.

In the case where the power switch 17 is turned off with the disk 1 kept in the loaded condition and is then turned on again, tile CPU 15 generates a command signal for starting the drive mechanism 4 and the TOC reading circuit 13, and one of file LEDs 22a to 22c is turned on in the same manner as the above. Further, when the disk 1 loaded in the drive mechanism 4 is identified as either the second or third kind of disk, the numerical indicating element 23 is driven to numerically indicate a recordable time on the disk 1 in the same manner as the above.

Although the disk player in file above preferred embodiment employs the two kinds of indicating means to indicate both the kind of the disk and the recordable time on the file disk, one of the two kinds of indicating means may be employed to achieve a sufficient effect in practical use.

Figure 2:
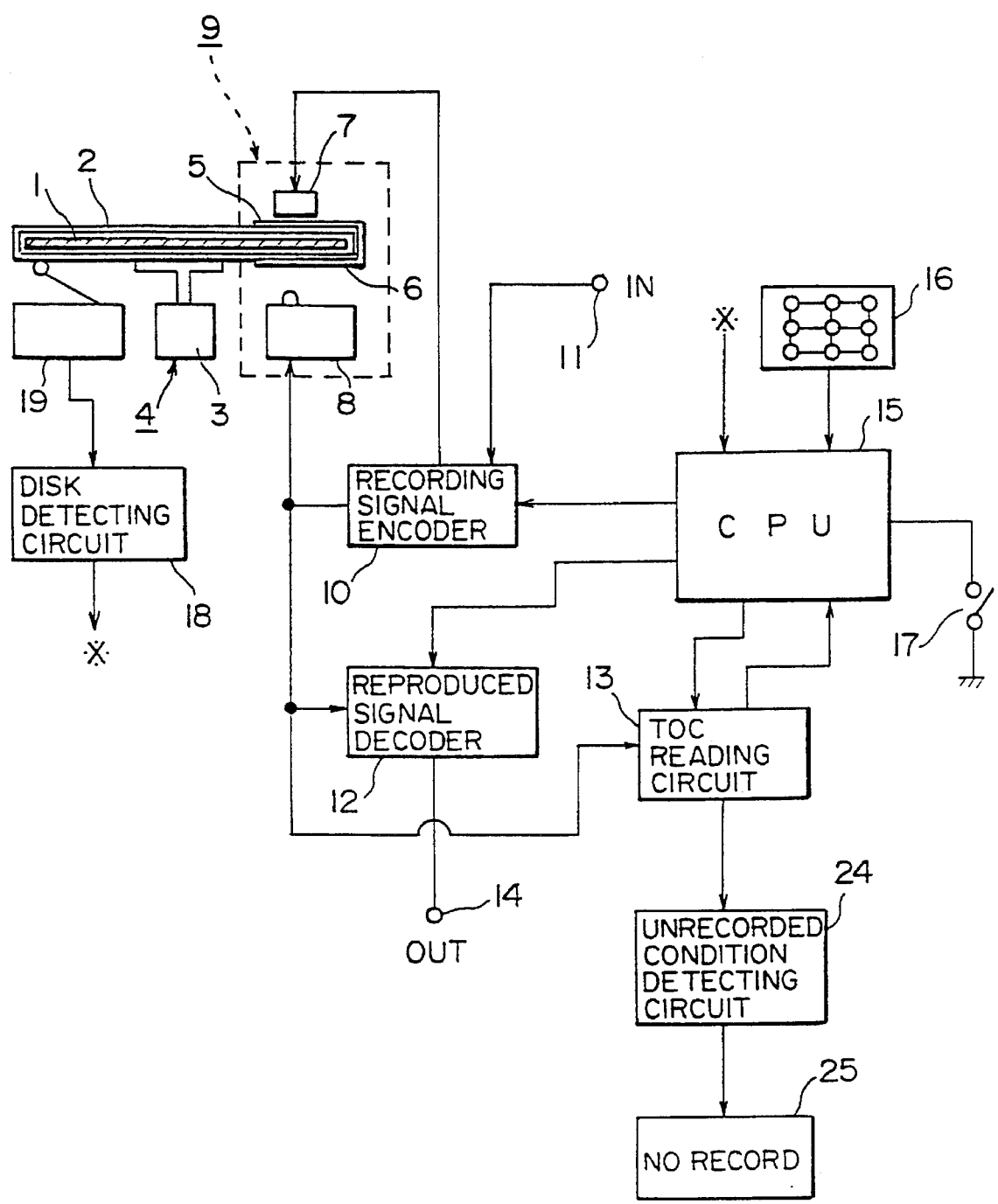
FIG. 2 is a block diagram of a disk player according to another preferred embodiment of the present invention.

Referring next to FIG. 2, there is shown another preferred embodiment of the present invention. In FIG. 2, the same reference numerals as those shown in FIG. 1 denote the same functional parts, and accordingly the explanation thereof will be omitted hereinafter as required. In the preferred embodiment shown in FIG. 2, an unrecorded condition detecting circuit 24 is connected to an output terminal of the TOC reading circuit 13. The unrecorded condition detecting circuit 24 determines whether or not any data is recorded on the disk 1 loaded into the drive mechanism 4, according to the TOC Information supplied from the TOC reading circuit 13. If no data is recorded on the disk 1 (i.e., if the disk 1 is a virgin disk), the unrecorded condition detecting circuit 24 generates a detection signal to drive an unrecorded condition indicator 25 as indicating means for indicating an unrecorded condition as by label of "NO RECORD". Thus, the user can immediately recognize that the disk 1 loaded into the drive mechanism 4 is in the unrecorded condition.

Also in the preferred embodiment shown in FIG. 2, when the power switch 17 is turned off with the disk 1 kept in the loaded condition and is then turned on again as similar to file case mentioned above, the CPU 15 generates a command signal for starting the drive mechanism 4 and the TOC reading circuit 13. Accordingly, when file disk 1 loaded in the drive mechanism 4 is in the unrecorded condition, the unrecorded condition indicator 2S is driven by the unrecorded condition detecting circuit 24 in the same manner as file above.

In the preferred embodiments shown in FIGS. 1 and 2, whether or not the disk 1 has been loaded into the drive mechanism 4 is mechanically detected by the disk detecting switch 19. Alternatively, focus search for the disk 1 may be preformed by the magneto-optical head unit 9 to thereby detect whether the disk 1 has been loaded into rile drive mechanism 4, according to the result of search.

In the case where the first kind of disk as the recorded disk is accommodated in file disk cartridge shown in FIG. 2, an unrecorded condition detecting circuit 24 is connected to an output terminal of the 2, the shutter 6 only is provided on the surface opposed to the optical head 8. On the other hand, in the case where the second kind of disk as the recordable disk or the third kind of disk as the partially recorded disk is accommodated in the disk cartridge 2, the shutters 5 and 6 are provided on both surfaces opposed to the magnetic head 7 and the optical head 8, respectively.

Accordingly, suitable means for detecting whether the shutter is provided on the single side or the double side of the disk cartridge loaded into the drive mechanism may be provided in file disk player, and the kind of the disk in the disk cartridge may be identified as either the recorded (unrecordable) disk or the recordable disk according to an output from file shutter detecting means.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A disk player comprising:

driving means for driving a disk loaded in a drive mechanism;

reading means for reading recorded data from said disk driven by said driving means;

reproduced signal decoding means for decoding an audio signal of said recorded data read by said reading means;

subcode information decoding means for decoding subcode information of said recorded data read by said reading means;

recordable time detecting means for computing the recordable time on said disk loaded in said drive mechanism according to said subcode information decoded by said subcode information decoding means; and indicating means for indicating the computed recordable time.

2. A disk player comprising:

driving means for driving a magneto-optical (MO) disk loaded in a drive mechanism;

reading means for reading recorded data from the MO disk driven by the driving means;

reproduced signal decoding means for decoding an audio signal of the recorded data read by the reading means;

subcode information decoding means for decoding subcode information of the recorded data read by the reading means;

recordable time detecting means for computing the recordable time on the MO disk loaded in the drive mechanism according to said subcode information decoded by said subcode information decoding means; and indicating means for visually indicating to a user a detection result from the detecting means which indicates the computed recordable time.

* * * * *